Oct. 16, 1962     W. R. GERCHOW     3,058,365
SPEED CHANGE DEVICE
Filed Jan. 16, 1961                                    4 Sheets-Sheet 1
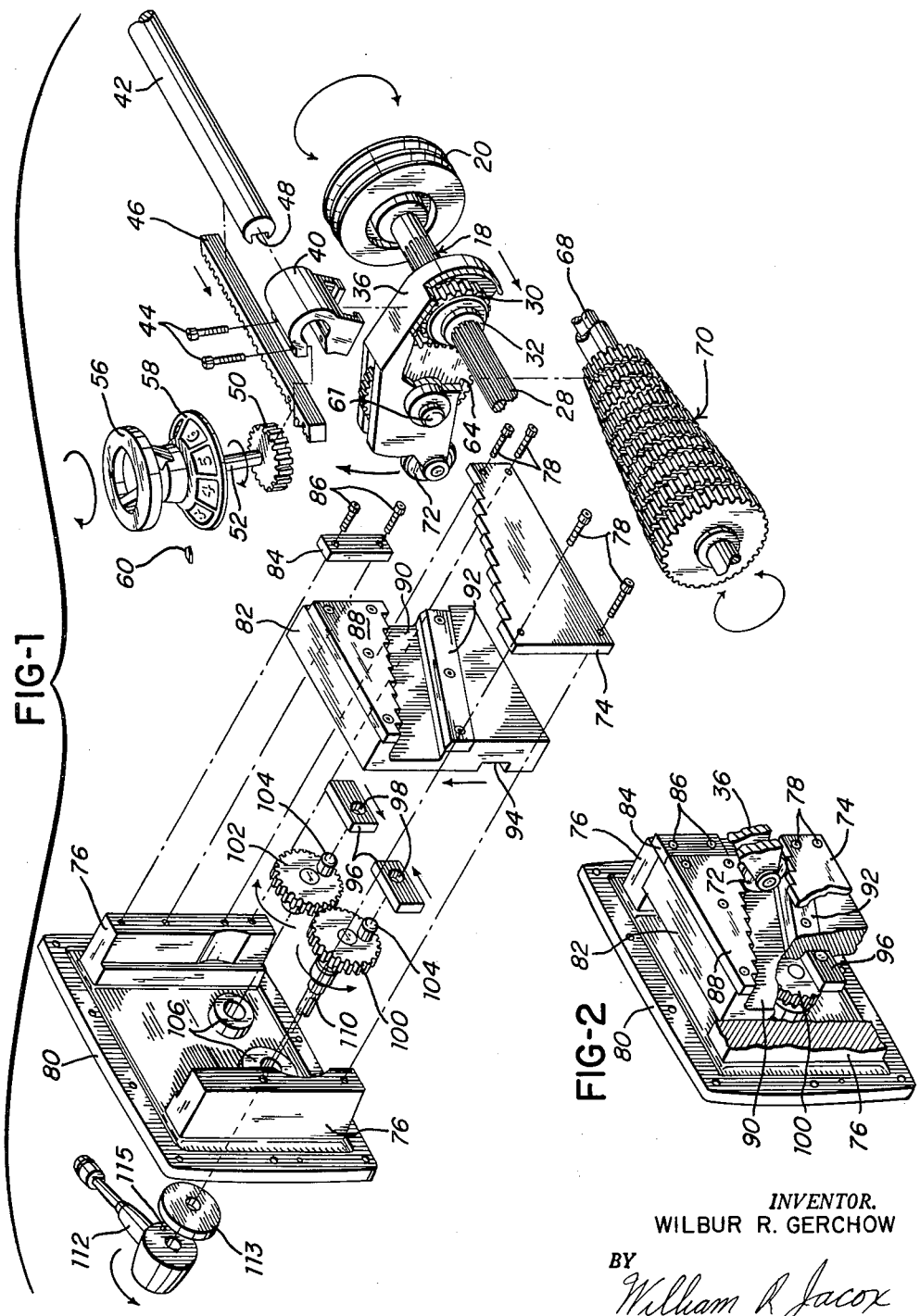
INVENTOR.
WILBUR R. GERCHOW
BY
William R Jacox
ATTORNEY Oct. 16, 1962   W. R. GERCHOW   3,058,365
SPEED CHANGE DEVICE
Filed Jan. 16, 1961   4 Sheets-Sheet 2
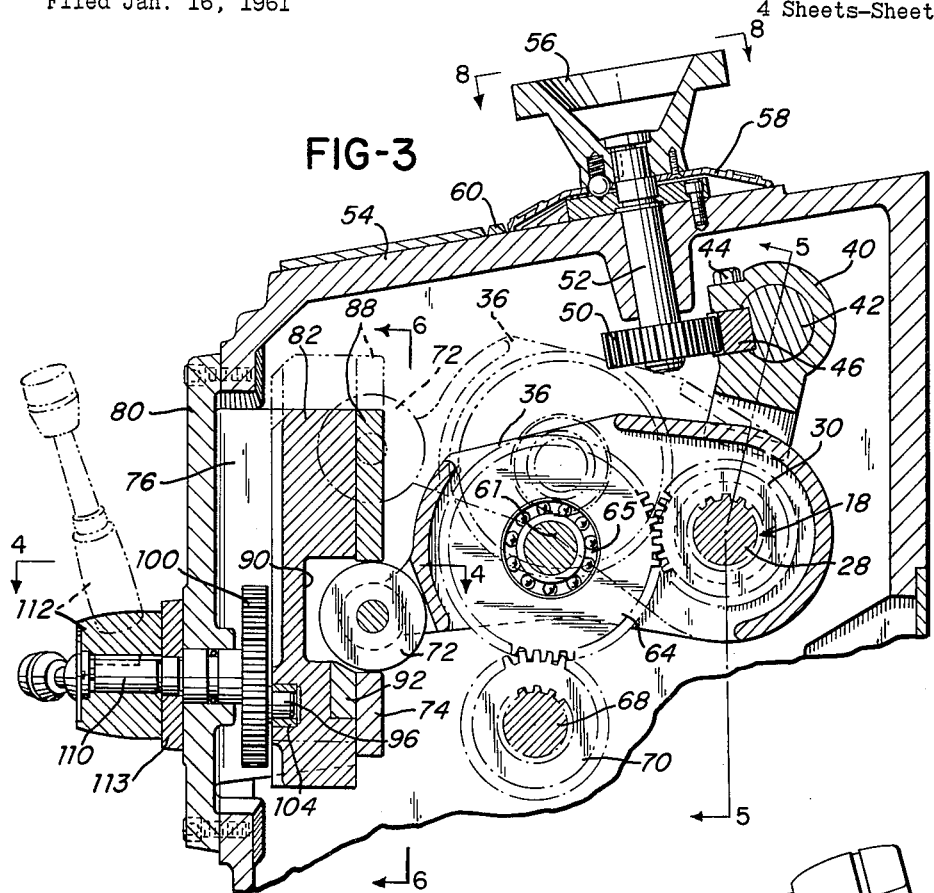
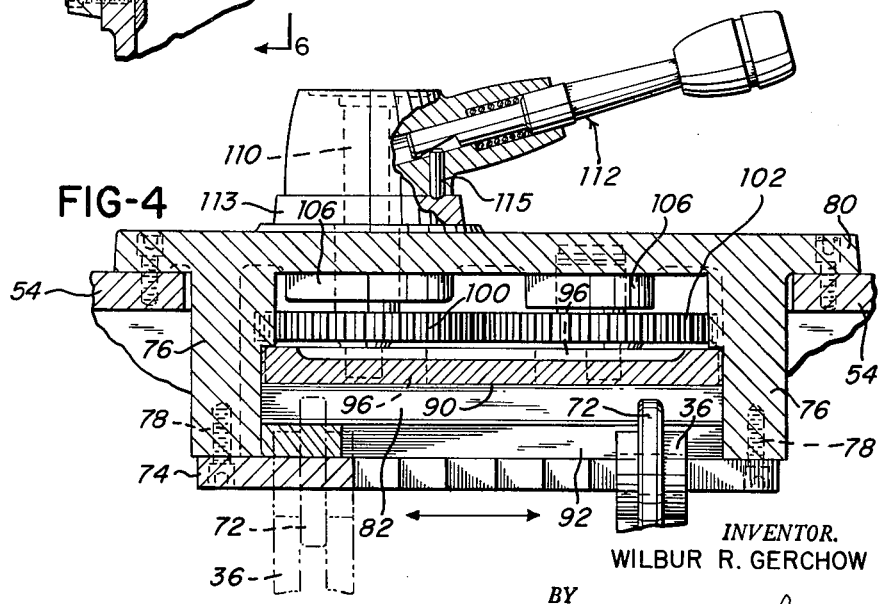
INVENTOR.
WILBUR R. GERCHOW
BY *William R Jacox*
ATTORNEY Oct. 16, 1962  W. R. GERCHOW  3,058,365
SPEED CHANGE DEVICE Filed Jan. 16, 1961  4 Sheets-Sheet 3

*INVENTOR.*
WILBUR R. GERCHOW
BY *William R. Jacox*
ATTORNEY

Oct. 16, 1962 W. R. GERCHOW 3,058,365
SPEED CHANGE DEVICE
Filed Jan. 16, 1961 4 Sheets-Sheet 4
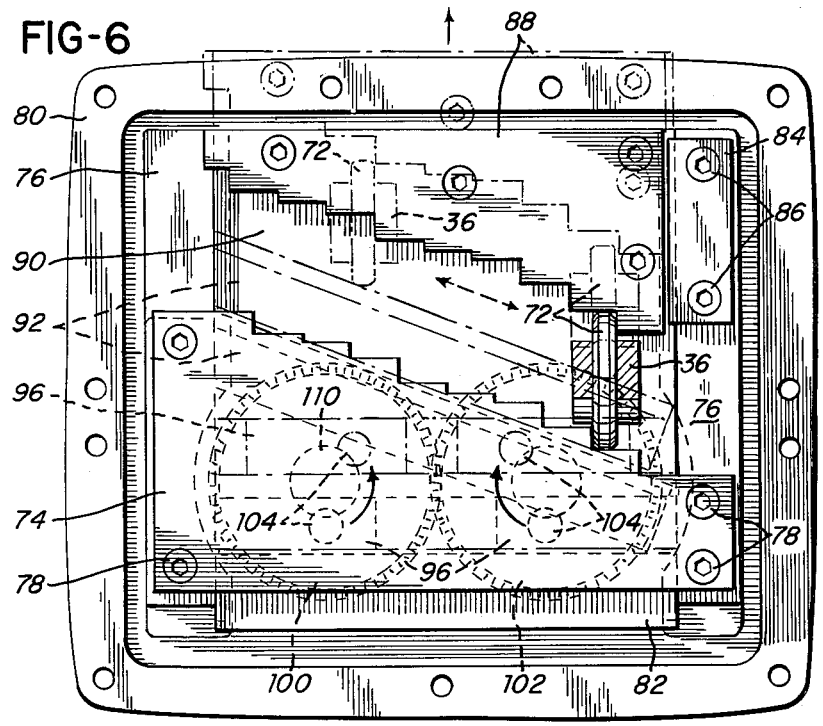
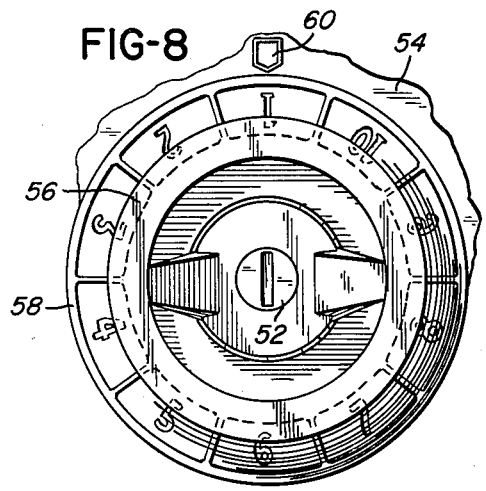
INVENTOR.
WILBUR R. GERCHOW
BY *William R Jacox*
ATTORNEY

United States Patent Office 3,058,365
Patented Oct. 16, 1962

3,058,365
SPEED CHANGE DEVICE
Wilbur R. Gerchow, Ann Arbor, Mich., assignor to The Sidney Machine Tool Company, Sidney, Ohio, a corporation of Ohio
Filed Jan. 16, 1961, Ser. No. 83,029
14 Claims. (Cl. 74—341)

This invention relates to a machine tool. The invention relates more particularly to speed changer mechanism for association with a machine tool.

Various mechanisms associated with machine tools require apparatus which is adapted to provide a plurality of rotational speed ratios between two rotary members or shafts.

It is an object of this invention to provide mechanism by which there are a plurality of available speed ratios between two rotary members.

Another object of this invention is to provide such a mechanism which may be readily, accurately, and easily controlled.

Another object of this invention is to provide such a mechanism which may be firmly and accurately secured in any one of its operating positions.

Other objects and advantages reside in the construction of parts, the combination thereof, the method of manufacture, and the mode of operation, as will become more apparent from the following description.

In the drawings:

FIGURE 1 is an exploded perspective view showing elements of the mechanism of this invention.

FIGURE 2 is a perspective view with parts broken away and shown in section of a portion of the elements of FIGURE 1.

FIGURE 3 is a sectional view of elements of the invention.

FIGURE 4 is a sectional view taken substantially on line 4—4 of FIGURE 3.

FIGURE 6 is a sectional view taken substantially on line 6—6 of FIGURE 3.

FIGURE 8 is an enlarged view taken substantially on line 8—8 of FIGURE 3.

Figure 5:
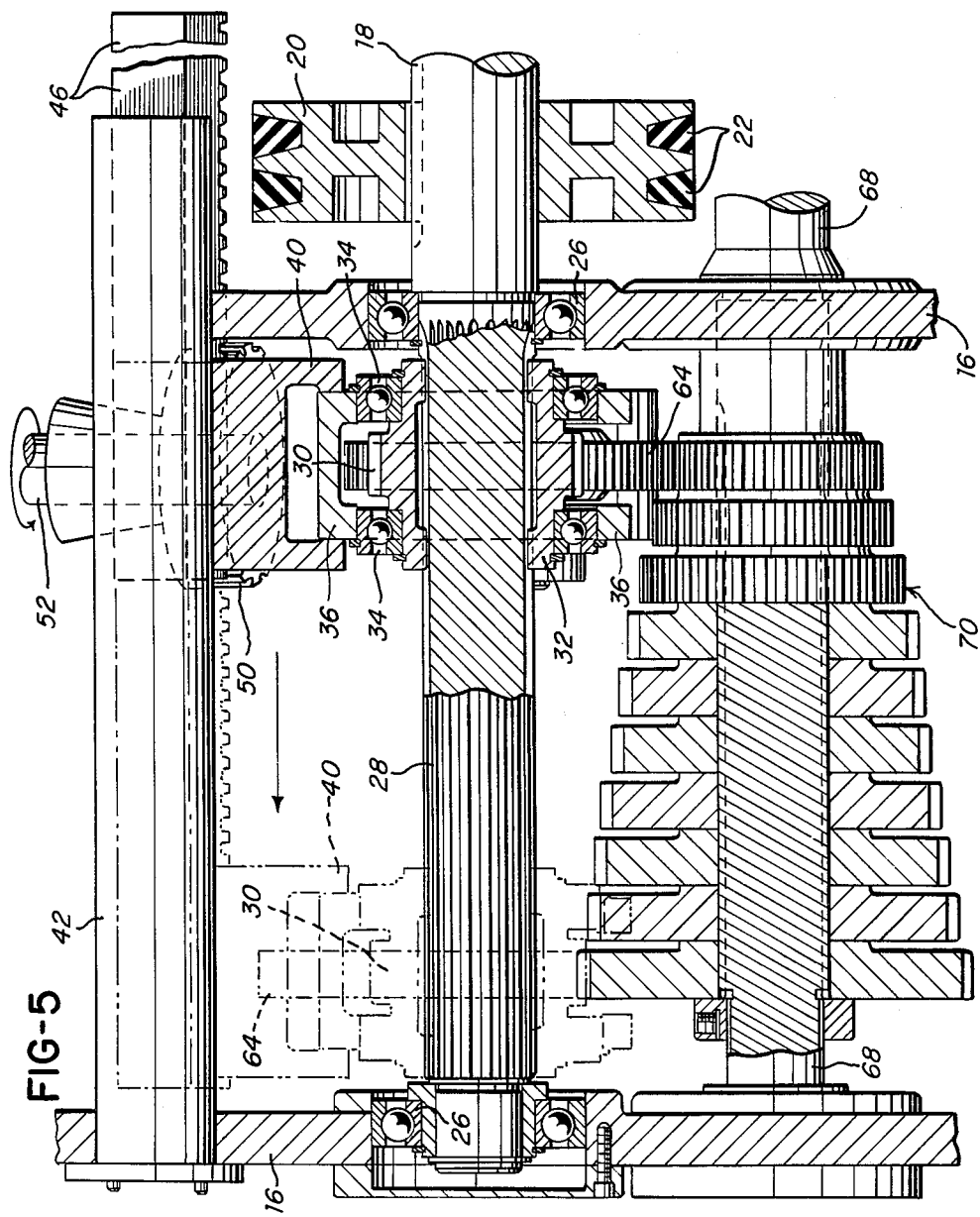
FIGURE 5 is an enlarged sectional view taken substantially on line 5—5 of FIGURE 3.

Referring to the drawings in detail, any suitable support structure 16 carries a driving shaft 18 which supports a pulley wheel 20 which is secured thereto for rotation thereof. The pulley wheel 20, shown in FIGURE 5, is driven by any suitable means, such as by belt members 22. The driving shaft 18 is carried in spaced-apart bearing members 26, shown in FIGURE 5.

The shaft 18 has a splined portion 28 intermediate the bearing members 26. A gear 30 has a hub 32 which is splined to the portion 28 of the shaft 18, as shown in FIGURES 1, 3, and 5, and is axially movable thereupon. The hub 32 carries a pair of bearings 34. The bearings 34 rotatively connect the hub 32 to a yoke 36 so that the yoke 36 is also axially movable along the shaft 18. A connector 40 is joined to the yoke 36. The connector 40 partially encompasses a bar 42 and is slidably axially movable thereupon. The bar 42 is rigidly attached to the support structure 16, as shown in FIGURE 5. Firmly attached to the connector 40 by means of bolt members 44 is a rack gear 46. The rack 46 is slidable axially movable within a groove 48 of the bar 42. A control gear 50 is in meshed relation with the rack 46. The control gear 50 is secured to a control shaft 52 which is rotatably carried by a housing 54, as shown in FIGURE 3. The control shaft 52 has a knob 56 attached thereto for rotation thereof. The knob 56 has attached thereto an indicator plate or dial 58 for rotation therewith. The indicator plate 58 has appropriate indicia, such as 1, 2, 3, 4, 5, 6, 7, 8, 9, and 10, thereon. Any of these numbers are alignable with a pointer 60. With rotative movement of the knob 56 the control gear 50 is rotated, causing axial movement of the rack 46. Due to the fact that the yoke 36 is connected to the rack 46 by means of the connector 40, the yoke 36 axially moves with the rack 46. The purpose for this movement is discussed below.

The yoke 36 supports a shaft 61 which carries a connector gear or intermediate gear 64 which is rotatable upon bearing means 65, shown in FIGURE 3. The gear 64 is always in mesh with the gear 30, as shown in FIGURES 1 and 3.

Adjacent the drive shaft 16 and parallel therewith is a driven shaft 68 which carries a group or cone of gears 70. As shown in FIGURES 1 and 5, the gears 70 are of various diameters, increasing in size from one end of the cone toward the other end thereof. The intermediate or connector gear 64 is adapted to meshingly engage any one of the gears 70.

The gear 70 which is engaged by the intermediate gear 64 is thus rotated with rotation of the drive shaft 18. It is to be understood, however, that in some mechanisms the shaft 68 may be the driving shaft and the shaft 18 the driven shaft. The rate of rotation of the shaft 68 with respect to the rate of rotation of the shaft 18 is, of course, dependent upon the diameter of the gear 70 of the shaft 68 which is in mesh with the intermediate gear 64. Shown in solid lines in FIGURE 5, the smallest of the gears 70 is in mesh with the connector gear 64 so that the highest rate of rotation of the shaft 68 with respect to the rate of rotation of the shaft 18 occurs. The method of shifting the connector gear from one of the gears 70 to another of the gears 70 is discussed below.

The yoke 36 has an extension 72 carried thereby which is adapted to normally rest upon a stepped plate 74. The extension 72 may be circular or arcuate or any other suitable shape but does not need to be rotative with respect to the yoke 36. The stepped place 74 is secured to a pedestal member 76 by means of bolts 78, shown in FIGURE 1. The pedestal members 76 are spaced one from the other and are carried by a base 80. The base 80 is attached to the support structure 16, as shown in FIGURES 3 and 4.

Disposed intermediate the pedestal members 76 is a block 82. The block 82 is adapted to reciprocally move along a vertical line, as illustrated in FIGURE 3. The block 82 is retained between the pedestal members 76 by the stepped plate 74 and by a lug 84, shown in FIGURES 1, 4, and 6, which is attached to the right hand pedestal member 76 by bolts 86.

Figure 7:
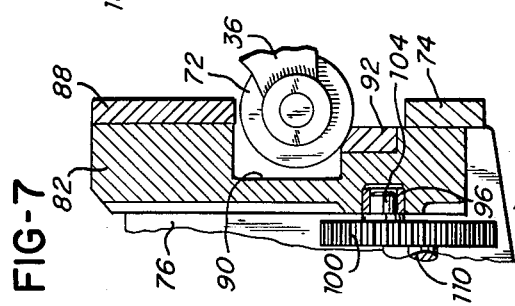
FIGURE 7 is a sectional view of a portion of the elements shown in FIGURE 3, but in another position of operation.

The block 82 also carries an inverted stepped plate 88 which is secured thereto. The plate 88 is preferably in a common plane with the stepped plate 74, as shown in FIGURES 3 and 7. As best shown in FIGURE 1, the block 82 has an inclined recess 90 therein. A bar 92 is attached to the block 82 at the lower edge of the recess 90. The extension 72 of the yoke 36 extends into the recess 90, as shown in FIGURE 3.

The block 82 has a transverse groove 94 in the rear surface thereof, as shown in FIGURE 1. Within the groove 94 are a pair of slide shoes 96 which are reciprocally movable therein. Each of the slide shoes 96 has an opening 98 therein, shown in FIGURE 1.

The slide shoes 96 are movable by means of cams 100 and 102, each of which has a pin 104 rigidly attached thereto. Each of the pins 104 is disposed within one of the openings 98 of the shoes 96 so that each of the cams 100 and 102 is capable of moving one of the shoes 96. The cams 100 and 102 are in meshed relation and are rotatably mounted in bearing housings 106 of the base 80, as shown in FIGURE 1. The cam 100 has a shaft 110 which extends through the base 80. The shaft 110 has attached thereto a handle 112 for rotation thereof. A spacer 113 separates the handle 112 from the base 80. If desired, a locking pin 115 may be used to secure the handle 112 in any adjusted position.

With rotation of the shaft 110 the cam 100 rotates, and due to the fact that the cam 100 is in mesh with the cam 102, the cam 102 rotates with the cam 100. Thus, the pins 104 of the cams 100 and 102 are moved. This movement of the pins 104, as the cams 100 and 102 rotate, causes axial and upward movement of the slide shoes 96. Such movement of the slide shoes 96 causes upward movement of the block 82.

As stated above, and as shown in FIGURES 3 and 7, the extension 72 of the yoke 36 is normally resting upon one of the steps of the stepped plate 74. However, as the block 82 is moved upwardly by the slide shoes 96, the bar 92 of the block 82 comes into engagement with the extension 72 and lifts the extension 72, as shown in FIGURES 6 and 7. Lifting of the extension 72 lifts the portion of the yoke 36 to which the extension 72 is attached and thus the yoke 36 is pivotally moved about the shaft 18, as shown in FIGURE 3. This moves the extension 72 away from the stepped plate 74.

The block 82 carries the bar 92 upwardly a sufficient distance with respect to the plate 74 that the extension 72 can be moved along the bar 92 without engagement with the stepped plate 74, as shown by broken lines in FIGURE 3 and as shown in FIGURE 7. While the block 82 is so positioned, the knob 56, as discussed above, is rotated so that any desired position of the dial 58 is obtained. Preferably, there is one dial position for each of the gears 70. Thus, the knob 56 is rotated to place the desired dial position in alignment with the pointer 60. As the knob 56 is rotated, the yoke 36 is laterally moved and axially moves the gear 30 along the shaft 18. As this movement of the yoke 36 occurs, the extension 72 moves laterally upon the bar 92 to the desired position with respect to the stepped plates 74 and 88.

Then the handle 112 is moved to rotate the shaft 110 to move the block 82 downwardly to its normal position. The bar 92 is thus lowered, lowering the extension 72 of the yoke 36. Thus, the extension 72 is lowered into resting position upon one of the steps of the stepped plate 74. The extension 72 is thus supported by the proper step of the plate 74 to place the connector gear 64 in proper mesh with the desired gear 70 of the shaft 68. As discussed above, the desired gear 70 is chosen by selective rotation of the knob 56.

As shown in FIGURE 6, when the block 82 is in its lowermost position, the extension 72 is engaged by the inverted stepped plate 88, as well as by the stepped plate 74. Thus, the extension 72 is secured between the plates 74 and 88. The yoke 36 thus remains in precise pivotal position to properly accurately mesh the connector gear 64 with the desired gear 70 as the extension 72 is locked between the stepped plates 74 and 88.

Due to the fact that the number of steps on the plates 74 and 88 is equal to the number of gears 70 on the shaft 68, the yoke 36 may be locked in any one of the positions necessary to cause proper mesh between the connector gear 64 and any one of the gears 70 of the shaft 68.

Thus, it is understood that the apparatus of this invention provides means by which any one of a plurality of possible speed ratios between two shafts can be easily, readily, and accurately obtained and maintained.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a rotary speed changer mechanism, a first shaft, a first gear carried by the first shaft and rotatable therewith, the first gear being axially movable with respect to the first shaft, a yoke attached to the first gear for axial movement thereof, control means operably connected to said yoke for axial movement thereof, an intermediate gear carried by the yoke and in meshed relation with the first gear, a second shaft, a cone of gears carried by the second shaft and rotatable therewith, the intermediate gear being engageable with any portion of the cone of gears, clamping means engageable with the yoke, the clamping means including a bar having an inclined surface, the control means moving said yoke along said inclined surface of the bar to align the intermediate gear with any portion of the cone of gears, the clamping means being engageable with the yoke and operable to secure the yoke so that the intermediate gear is in meshed relation with any portion of said cone of gears.

2. In rotary apparatus, a yoke, a first rotatable gear and an intermediate rotatable gear in meshed relation and attached to the yoke, the yoke being pivotally movable about the axis of rotation of the first gear, the first gear being axially movable, the yoke being laterally movable with axial movement of the first gear, gear means engageable by the intermediate gear for meshed relation therewith, a reciprocally movable block provided with an angular slot therein, the upper portion of the slot having a stepped surface, a fixed plate adjacent the block and having a stepped surface, the block being movable so that the stepped surface of the block is moved toward and away from the stepped surface of the plate, the yoke having a portion disposed between said stepped surfaces, the block being movable to clamp said portion of the yoke between the stepped surfaces.

3. In rotary apparatus, gear changer apparatus including a group of coaxial gears of various diameters, a yoke, a gear member carried by the yoke, the yoke being laterally and pivotally movable to place the gear member carried thereby in meshed relation with any one of said group of gears, a clamping member, the clamping member having an angular recess therein, the yoke having a portion disposed within said angular recess, a wall of the recess having an inverted stepped surface, the opposite surface of the recess being an inclined surface which is substantially parallel to a line taken through said inverted stepped surface, a support member having a stepped surface adjacent said inclined surface of the clamping member, said portion of the yoke being positionable intermediate any portions of the stepped surfaces of the clamping member and the support member, the clamping member being movable toward and away from the support member to clamp and to unclamp said portion of the yoke.

4. In an adjustment apparatus, a yoke, a rotary member carried by the yoke, a rotatable cone member adjacent the yoke and having a plurality of axially spaced portions, the yoke being pivotally and axially movable to place the rotary member in engagement with any one of the axially spaced portions of the cone member, support structure, a plurality of interlocked cam members rotatably carried by the support structure, a fixed clamp member attached to the support structure and having a stepped section, a movable clamp member carried by the support structure, the movable clamp member being engaged by said cam members for movement thereof, the movable clamp member having an inverted stepped section in alignment with the stepped section of the fixed element, the cam members being operable to move the inverted stepped section of the movable clamp member toward and away from the stepped section of the fixed clamp member, the movable clamp member having an angularly inclined surface adjacent the stepped surface of the fixed clamp member, the yoke having a portion disposed intermediate the inverted stepped section of the movable clamp member and the stepped section of the fixed clamp member, said portion of the yoke being movable along the inclined surface of the movable clamp member, the movable clamp member being movable toward the fixed clamp member to clamp said portion of the yoke between the stepped surfaces of said clamp members.

5. In a mechanical control unit, a base member, a pair of spaced-apart pedestal members carried by the base member, a block retained intermediate the pedestal members of the base member and reciprocally movable along a line parallel to the pedestal members, a first stepped plate carried by the pedestal members and firmly attached thereto, an inverted stepped plate carried by the block and coplanar with the first stepped plate, a yoke pivotal about an axis spaced from said base and block, the yoke having an extension engageable with the stepped plates, the block having an angular portion engageable with said extension of the yoke to move said extension in a direction away from the first stepped plate with movement of said block in a direction away from the first stepped plate, the extension being positioned between the first stepped plate and the inverted stepped plate and simultaneously engageable by both of the stepped plates by movement of the block toward the first stepped plate.

6. In mechanical control apparatus, a base, a yoke pivotally movable about an axis spaced from the base, a pair of stepped clamping members carried by the base and relatively reciprocally movable, a bar having an angularly inclined surface disposed adjacent the clamping members, the yoke having a portion disposed between the clamping members, said portion of the yoke being engageable with said surface of the bar upon relative movement of the clamping members one away from the other, said portion of the yoke being laterally movable along said surface of the bar when in engagement therewith, said portion of the yoke being clamped between the clamping members upon relative movement of the clamping members one toward the other.

7. In mechanical positioning apparatus, a rotatable cam member provided with an eccentrically positioned fixed element, a cam follower having an elongate slot therein, the cam follower being guided for reciprocal movement along a line substantially normal to the elongate slot, said fixed element of the cam member being movable lengthwise within the slot of the cam follower, movable clamping means having a plurality of engagement surfaces carried by the cam follower, fixed clamping means having a plurality of engagement surfaces positioned adjacent the cam follower, and an angular support bar carried by one of said clamping means.

8. In mechanical positioning apparatus, a rotatable cam member provided with an eccentrically positioned fixed element, a cam follower having an elongate slot therein, the cam follower being guided for reciprocal movement along a line substantially normal to the elongate slot, said fixed element of the cam member being movable within the slot of the cam follower, movable clamping means having a plurality of engagement surfaces carried by the cam follower, fixed clamping means having a plurality of engagement surfaces and positioned adjacent the cam follower, an angular support bar carried by one of said clamping means, an engagement member disposed between said clamping means, the engagement member being movable along said angular support bar and positionable between any of the engagement surfaces of the clamping means.

9. In mechanical adjustment and clamping apparatus, a pair of interengaged cam members rotatable one with the other, each of the cam members having an axially extending eccentrically positioned portion, a pair of shoes, there being one shoe for each of the cam members, each of the shoes being rotatably mounted upon the eccentrically positioned portion of its respective cam member, a movable clamping member having an elongate slot therein, the movable clamping member being reciprocally movable along a line substantially normal to the elongate slot thereof, said shoes being positioned within said elongate slot and movable lengthwise therein, the movable clamping member thus being moved with rotation of the cam members, a stationary clamping member, the stationary clamping member and the movable clamping member having a plurality of complementary surfaces, the movable clamping member being movable toward and away from the stationary clamping member, and adjustment member disposed between the clamping members, an elongate support bar extending across the clamping members and disposed between the clamping members, the elongate support bar extending across the clamping members and engageable by the adjustment member, the adjustment member being movable along the support bar to alignment with any of the surfaces of the clamping members.

10. In rotary speed changer apparatus, a first shaft, a second shaft, first gear means, the first gear means being carried by the first shaft for rotation therewith and axially movable with respect thereto, second gear means, the second gear means being attached to the second shaft and rotatable therewith, the second gear means having a plurality of toothed portions forming a cone, a yoke pivotal about the first shaft and laterally movable with axial movement of said first gear means, a connector gear rotatably carried by the yoke and in meshed relation with the first gear means, the yoke being laterally movable to place the connector gear in mesh with any of said toothed portions of said second gear means, clamping means having two relatively movable jaw portions, the jaw portions having complementary stepped surfaces, the stepped surfaces also being substantially complementary to the toothed portions of the second gear means, the yoke having a portion intermediate the jaw portions of the clamping means, a bar having a slope substantially equal to that of the cone of the second gear means, the bar being adjacent the clamping means and engageable by said portion of the yoke when the jaw portions are moved in a direction one from the other, and means for movement of said portion of the yoke along said bar for positioning the connector gear in alignment with any one of the toothed portions of the cone of the second gear means, the jaw portions of the clamping means being relatively movable one toward the other to clamp said portion of the yoke in any adjusted position so that the connector gear is in proper mesh with the second gear means.

11. In a mechanical control unit,
fixed support structure,
pivotal support means carried by the fixed support structure,
clamping means carried by the support structure and having opposed relatively reciprocally movable parts, the opposed parts of the clamping means having opposed engagement surfaces,
angular support means disposed adjacent the clamping means,
the pivotal support means having a portion thereof disposed between said opposed relatively reciprocally movable parts of the clamping means,
said portion of the pivotal support means being engageable with said angular support means upon relative movement between said reciprocally movable parts of the clamping means,
said portion of the pivotal support means being laterally movable along the angular support means,
said portion of the pivotal support means being clamped between said parts of the clamping means upon relative movement between said parts of the clamping means.

12. A control unit according to claim 11 in which the opposed engagement surfaces of the relatively movable parts of the clamping means have a plurality of complementary portions.

13. A control unit according to claim 11 in which the opposed engagement surfaces of the relatively movable parts of the clamping means are provided with a plurality of steps.

14. In rotary apparatus,
pivotal support means,
first rotatable gear means and intermediate rotatable gear means in meshed relation one with the other and carried by the pivotal support means, the pivotal support means being pivotally movable about the axis of rotation of the first gear means,
the pivotal support means being laterally movable, the first gear means and the intermediate gear means being axially movable with lateral movement of the pivotal support means,
third gear means, the third gear means being engageable by the intermediate gear means in meshed relation therewith,
clamping means having opposed relatively reciprocally movable parts, angular support means disposed adjacent the clamping means,
the pivotal support means having a portion thereof disposed intermediate said opposed relatively reciprocally movable parts of the clamping means, said portion of the pivotal support means being engageable with said angular support means upon relative movement between said reciprocally movable parts of the clamping means, said portion of the pivotal support means being laterally movable along the angular support means, said portion of the pivotal support means being clamped between said parts of the clamping means upon relative movement between said parts of the clamping means.

References Cited in the file of this patent

UNITED STATES PATENTS

| | | |
|---|---|---|
| 2,662,417 | Mascherpa | Dec. 15, 1953 |
| 2,743,622 | Haupt | May 1, 1956 |